(12) United States Patent
Uchida et al.

(10) Patent No.: US 6,273,036 B1
(45) Date of Patent: Aug. 14, 2001

(54) EXHAUST CONTROL VALVE ASSEMBLY FOR AN ENGINE

(75) Inventors: Hiroyuki Uchida; Shigeyuki Hara, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/539,789

(22) Filed: Mar. 31, 2000

(30) Foreign Application Priority Data

Mar. 31, 1999 (JP) .................................................. 11-091370

(51) Int. Cl.⁷ ...................................................... F02B 75/02
(52) U.S. Cl. ......................................................... 123/65 PE
(58) Field of Search ............................................ 123/65 PE

(56) References Cited

U.S. PATENT DOCUMENTS 4,368,703 * 1/1983 Shibata .............................. 123/65 PE
4,621,596 * 11/1986 Uchinishi .......................... 123/65 PE
4,829,946 * 5/1989 Boyesen ............................ 123/65 PE

FOREIGN PATENT DOCUMENTS 63-306227    12/1988   (JP) .

\* cited by examiner

*Primary Examiner*—Noah P. Kamen
(74) *Attorney, Agent, or Firm*—Birch, Stewart, Kolasch & Birch, LLP

(57) ABSTRACT

An exhaust control valve assembly for a two-cycle engine includes a governor for moving an exhaust control valve in opening and closing directions to advance or retard a timing of opening of an exhuast port. The governor includes a governor spring for urging the exahust control valve in the closing direction. The governor spring exhibits a changing spring constant which increases as the exhaust control valve moves in the opening direction.

19 Claims, 7 Drawing Sheets

EXHAUST CONTROL VALVE ASSEMBLY FOR AN ENGINE

BACKGROUND OF THE INVENTION

1. Field of the Invention

The present invention relates to an exhaust control valve assembly for an engine, such as a two-cycle engine.

2. Description of the Relevant Art

In accordance with the background art, an exhaust control valve assembly includes an exhaust control valve. The exhaust control valve is opened or closed in order to advance or retard the opening of an exhaust port. A drive system causes opening and closing of the exhaust control valve. Such an arrangement in disclosed, for example, in Japanese Patent Laid-Open Publication No. Sho. 63-306227.

The background art's exhaust control valve assembly suffers drawbacks. When the engine is running at high speed, the actual timing or degree of opening of the exhaust control valve gets ahead of the desired timing or degree of opening. When the actual timing or degree of opening is ahead of the desired timing or degree of opening, the engine's output performance is reduced.

SUMMARY OF THE INVENTION

The present inventors have discovered the source of the drawbacks, and invented a solution to the drawbacks. The present inventors observed that pressure within the exhaust port increases with increases in engine speed. The increased pressure, within the exhaust port, acts on the exhaust control valve, in the opening direction of the exhaust control valve, causing the exhaust control valve to open sooner or more than required.

It is therefore the object of the present invention to provide an exhaust control valve assembly, which increases the output performance of an engine.

It is another object of the present invention to provide an exhaust control valve assembly, which opens the exhaust control valve to a desired timing and degree.

These and other objects of the invention are accomplished by an engine comprising: a cylinder block having a cylinder bore; an exhaust opening at an inner wall of said cylinder bore; an exhaust control valve moveable in an opening direction and a closing direction to at least partially block said exhaust opening, and a governor attached to said exhaust control valve for moving said exhaust control valve in the opening direction in response to an increased engine speed, said governor including a governor spring urging said exhaust control valve in the closing direction, wherein said governor spring has a spring force which changes as said exhaust control valve moves.

Further, these and other objects of the invention are accomplished by an engine comprising: a cylinder block having a cylinder bore; an exhaust opening at an inner wall of said cylinder bore; an exhaust control valve moveable in an opening direction and a closing direction to at least partially block said exhaust opening; and a governor attached to said exhaust control valve for moving said exhaust control valve in the opening direction in response to an increased engine speed, said governor including a first spring and a second spring urging said exhaust control valve in the closing direction, wherein said first and second springs present an overall spring force which changes as said exhaust control valve moves.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitative of the present invention, and wherein.

DETAILED DESCRIPTION OF THE INVENTION

Figure 1:
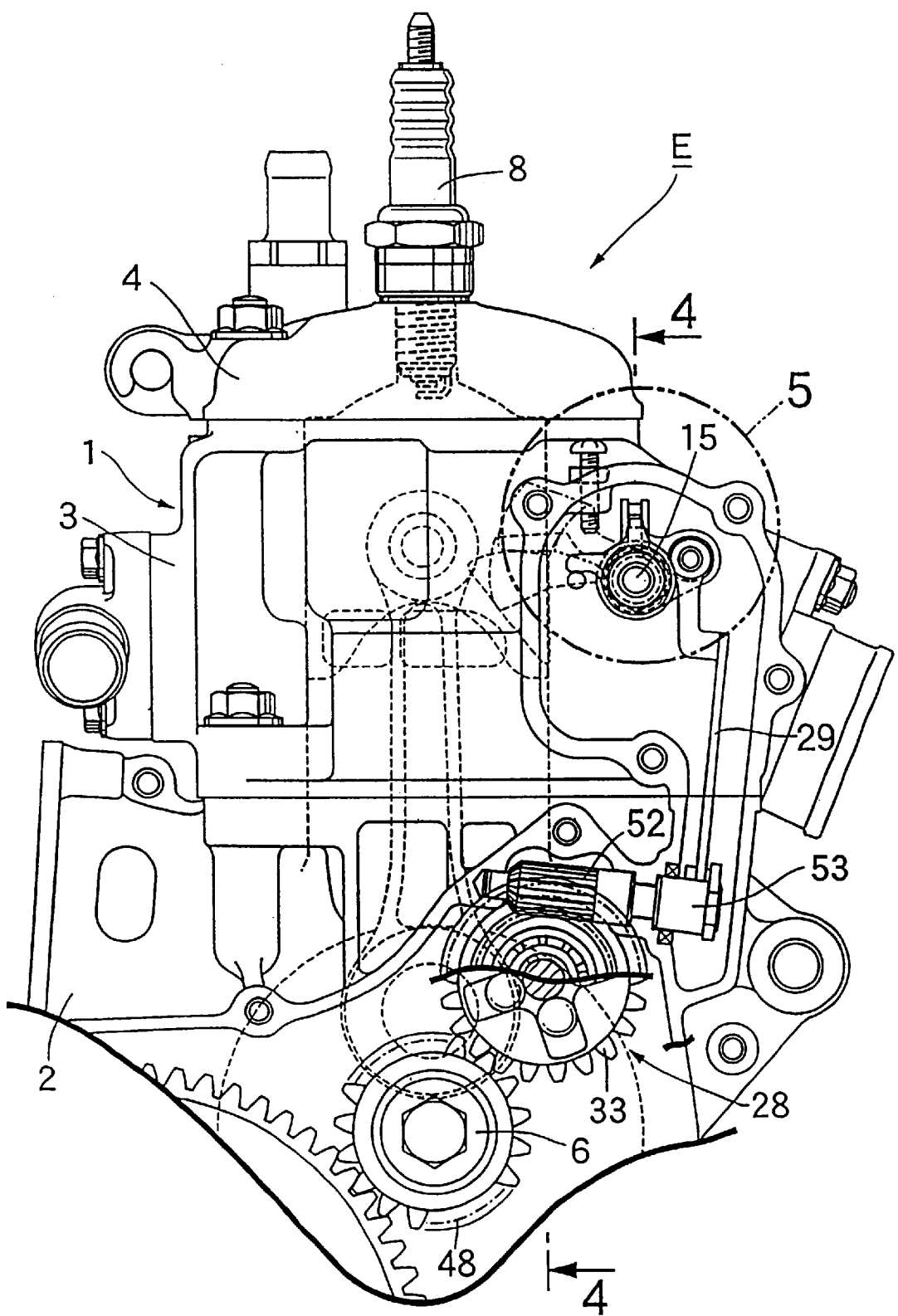
FIG. 1 is a side view of a two-cycle engine, equipped with the exhaust control valve of the present invention.
Figure 2:
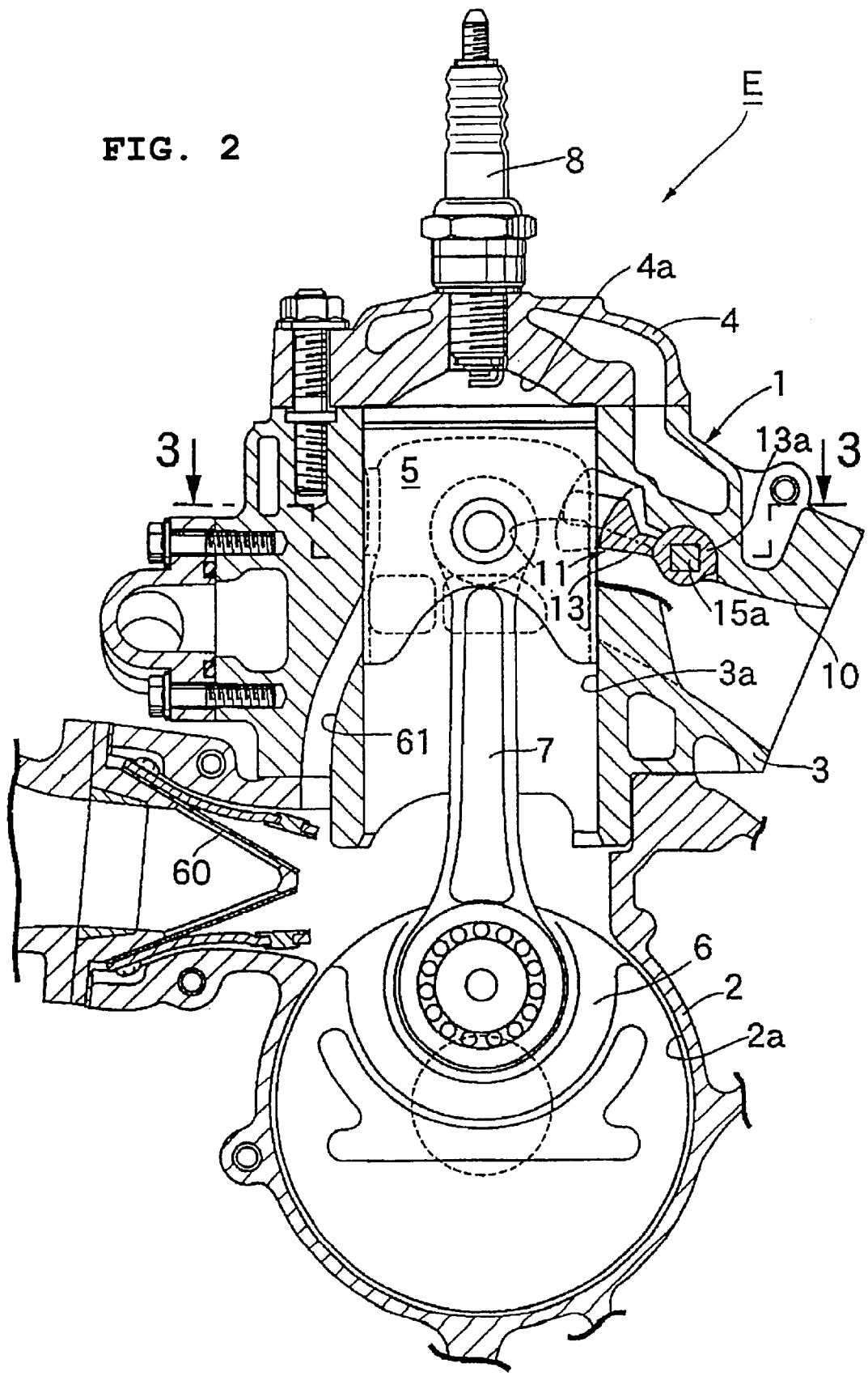
FIG. 2 is a cross-sectional view of the engine of FIG. 1.
Figure 3:
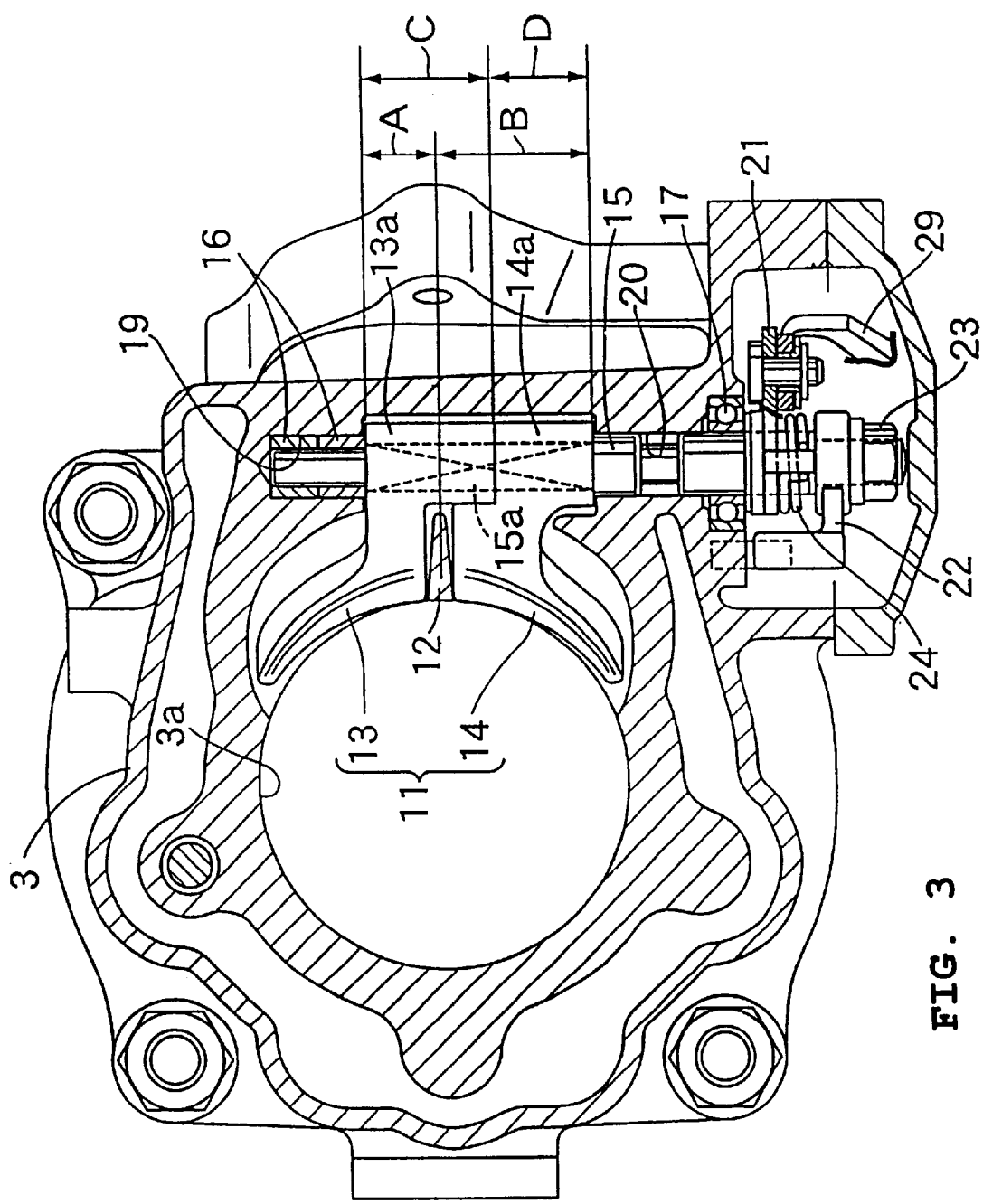
FIG. 3 is a cross-sectional view taken along line 3—3 of FIG. 2.

FIGS. 1–3 illustrate a two-cycle motorcycle engine E, with an engine main body 1. The engine main body 1 includes a crankcase 2, a cylinder block 3 connected to an upper end of the crankcase 2, and a cylinder head 4 connected to an upper end of the cylinder block 3. A piston 5, rising and falling in a cylinder bore 3a of the cylinder block 3, is connected to a crankshaft 6 via a connecting rod 7. The crankshaft 6 is housed in and supported by the crankcase 2. One or more spark plugs 8 are then screwed into the cylinder head 4, so that electrodes of the spark plugs 8 face an ignition chamber 4a.

An exhaust port 10, opened and closed by the piston 5, is provided in the surrounding wall of the cylinder block 3. An exhaust control valve 11 is arranged at an upper edge of an upstream opening of the exhaust port 10, near the cylinder bore 3a. The exhaust control valve 11 exerts control in such a manner as to advance the timing of opening of the exhaust port 10, according to increases in the engine speed. A reinforcing wall 12 is integrally formed with, or alternately attached to, the cylinder block 3. The reinforcing wall 12 laterally bisects a central part of the upstream opening of the exhaust port 10 and connects a first or upper wall and a second or lower wall.

As shown in FIG. 3, the exhaust control valve 11 includes a first valve element 13 and a second valve element 14, arranged so as to sandwich the reinforcing wall 12, and a single valve stem 15. The valve stem 15 is coupled to a first boss 13a and a second boss 14a of the first valve element 13 and the second valve element 14, respectively. The end surfaces of the first and second valve elements 13 and 14 are formed as arced surfaces, continuing on from the inner surface of the cylinder bore 3a, and the first boss 13a and the second boss 14a abut from the rear of the reinforcing wall 12.

The valve stem 15 is supported at both ends. One end is supported by a bushing 16. The other end is supported by a ball bearing 17. The bushing 16 and ball bearing 17 are lined up along the same axis of the valve stem. The bushing 16 is fitted into a pouch-shaped bearing hole 19 provided at a sidewall of the cylinder block 3. The ball bearing 17 is fitted into a bearing through-hole 20 at the other sidewall of the cylinder block 3. A central part of the valve stem 15 is formed with angled surfaces 15a, such a square cross sectional shape. The first boss 13a and the second boss 14a of the valve elements 13 and 14 engage with the angled surfaces 15a of the valve stem 15, so as to rotate in unison therewith.

Figure 4:
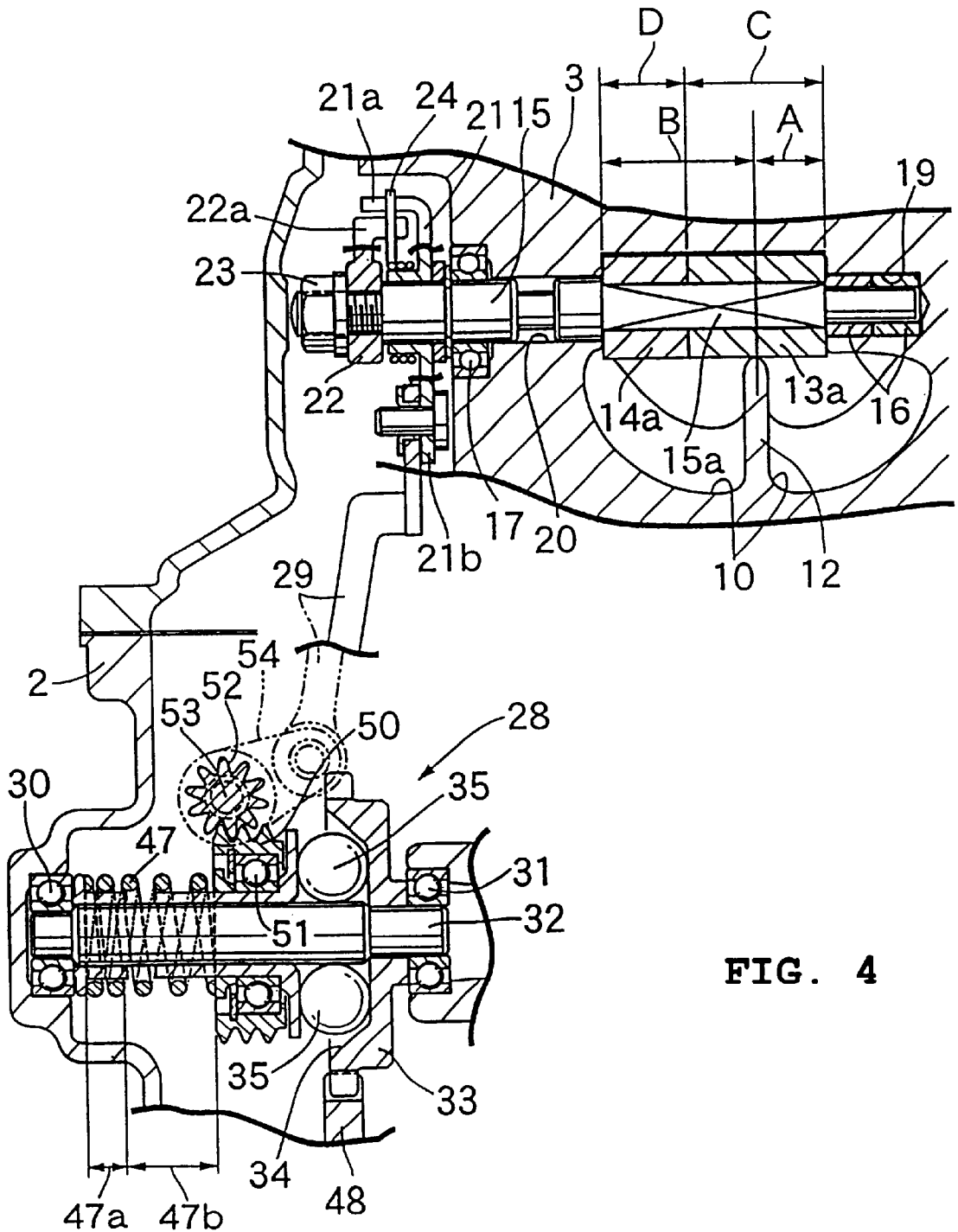
FIG. 4 is a cross-sectional view taken along line 4—4 of FIG. 1.

As shown in FIGS. 3 and 4, rocker valve sections of the first and second valve elements 13 and 14 are formed in a symmetrical manner with respect to the reinforcing wall 12. The first boss 13a and the second boss 14a of the valve elements 13 and 14 are formed and positioned in a particular manner, in accordance with the present invention. Namely, a first distance (A) represents a distance, in an axial direction of the valve stem 15, from the outer end of the boss 13a, on the pouch-shaped bearing hole 19 side, to the center of the reinforcing wall 12. Also, a second distance (B) represents a distance, in the axial direction of the valve stem, from the outer end of the boss 14a, on the bearing through hole 20 side, to the center of the reinforcing wall 12. The first distance (A) is set to be less than the second distance (B). As a result, both the first boss 13a and the second boss 14a are arranged in such a manner as to be offset overall from the reinforcing wall 12 towards the bearing through hole 20 side of the exhaust port 10.

A further aspect of the invention is to define the length of the first boss 13a as a first length (C), and to define the length of the second boss 14a as a second length (D). The first length (C) is set to be greater than the second length (D). As a result, the thermal capacity of the first boss 13a is larger than the thermal capacity of the second boss 14a.

Figure 5:
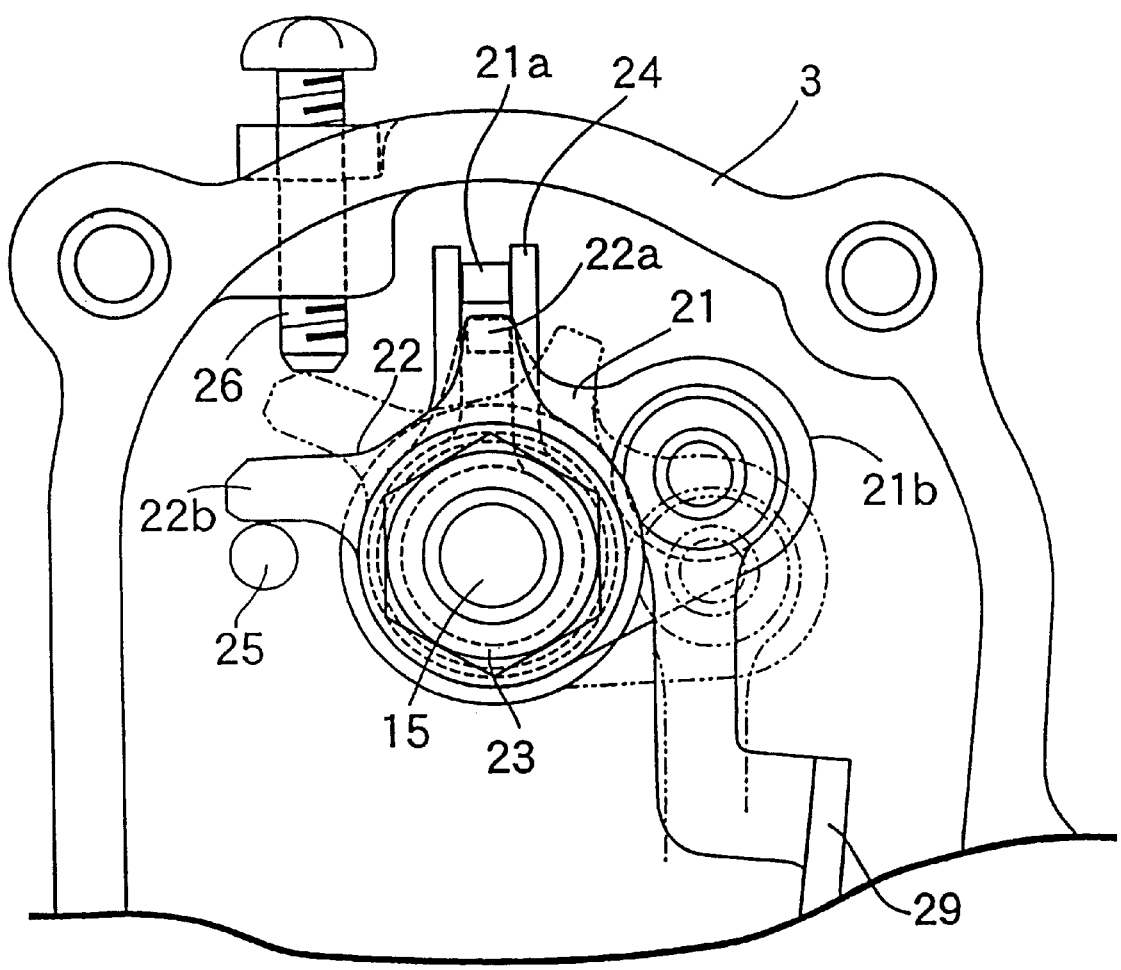
FIG. 5 is an enlarged view of a portion of the engine within a dashed circle 5 of FIG. 1.

As shown in FIGS. 4 and 5, a first driven lever 21 and a second driven lever 22 are attached in a rotatable manner to a second end of the valve stem 15, protruding outwards from the ball bearing 17. The first driven lever 21 and the second driven lever 22 are attached using a nut 23. The first driven lever 21 is equipped with first and second arms 21a and 21b. The second driven lever 22 is equipped with first and second arms 22a and 22b. The first arms 21a and 22a of the first and second driven levers 21 and 22 are coupled by a pincer spring 24. The pincer spring 24 is in the form of a twisted coil fitted at the valve stem 15. The first driven lever 21 therefore rotates the second driven lever 22, via the pincer spring 24, so that the exhaust control valve 11 is vertically opened and closed via the valve stem 15.

A lower limit stopper 25 and an upper limit stopper 26 are arranged opposite each other at a lower surface and upper surface of the second arm 22b of the second driven lever 22, respectively. The lower limit stopper 25 and upper limit stopper 26 limit the extent of opening and closing of the exhaust control valve 11. The lower limit stopper 25 stops a lower surface of the second arm 22b, so as to define the closed position of the exhaust control valve 11. The upper limit stopper 26 stops an upper surface of the second arm 22b, so as to define the open position of the exhaust control valve 11. The pincer spring 24 can also be modified, so that rotation of the second driven lever 22 is allowed to exceed the extent of rotation of the first driven lever 21.

A centrifugal governor 28 is coupled to the second arm 21a of the first driven lever 21 via a link 29. The centrifugal governor 28 includes a support shaft 32, supported at the crankcase 2 via a pair of ball bearings 30 and 31, a governor gear 33, fixed to the support shaft 32; a plurality of centrifugal weights 35, arranged about the support shaft 32 at a conical recess 34 formed at the side of the governor gear 33; a slider 36, supported in a freely slidable manner at the support shaft 32, and making contact with the group of centrifugal weights 35 on the opposite side to the governor gear 33; and a governor spring 47, for urging the slider 36 towards the side of the centrifugal weights 35 with a prescribed setting load. A drive gear 48, fixed to the crankshaft 6, meshes with the governor gear 33 to bring about driving.

An annular rack 50 is attached to the slider 36, in a freely rotatable manner, via a ball bearing 51. A pinion shaft 53, having a pinion 52 meshing with the annular rack 50, is supported in a freely rotatable manner at the crankcase 2. A drive lever 54, fixed to an end of the pinion shaft 53, is coupled to the second arm 21b of the first driven lever 21 via the link 29.

As illustrated in FIG. 4, the governor spring 47 is a single coil spring installed at the outer periphery of the support shaft 32. The governor spring 47 is equipped with a small pitch coil section 47a and a large pitch coil section 47b. With reference to the above elements, a drive system for driving the valve stem 15 is constituted by the centrifugal governor 28, the pinion shaft 53, the drive lever 54, the link 29, the first driven lever 21, the pincer spring 24, and the second driven lever 22.

During operation, when the engine is running, the governor gear 33 is driven from the drive gear 48 of the crankshaft 6. The centrifugal weights 35 rotate in accompaniment with this rotation, and push outward of the conical surface of the recess 34, due to their centrifugal force. The centrifugal weights 35 try to push the slider 36 towards the side of the governor spring 47.

When the engine is running at low speeds, the setting load of the governor spring 47 is larger than the force the group of centrifugal weights 35 exerts on the slider 36. Because the centrifugal force of the group of centrifugal weights 35 is low, the slider 36 and annular rack 50 are held in the retreated position shown in FIG. 4. In this position, the drive lever 54 is in an advanced position. In the advanced position, the second driven lever 22 is rotated, via the link 29, the first driven lever 21, and the pincer spring 24, to a position whereby contact is made with the lower limit stopper 25. In the advanced position, the exhaust control valve 11 is held in a closed position (downward position). As a result, the timing of opening the exhaust port 10 is the most delayed, and at the time of the exhaust stroke, the blowing of new air into the exhaust port 10 from the combustion chamber 4a is severely restricted, whereby stability at low running speeds can be achieved.

When the engine speed increases, the thrust on the slider 36, exerted by of the centrifugal weights 35, is greater than the setting load of the governor spring 47. The thrust moves the slider 36 until the thrust force balances with the increasing load of the governor spring 47. The drive lever 54 moves in unison with the slider 36 from the withdrawn position. The second driven lever 22 rotates upwards, via the link 29, the first driven lever 21, and pincer spring 24. Hence, the exhaust control valve 11 is opened (upward position).

When the engine E reaches a prescribed high-speed running state, the second driven lever 22 is stopped by the upper limit stopper 26, and the exhaust control valve 11 is kept in a completely open state. Scavenging of the ignition chamber 4a due to new air at the time of the exhaust stroke can then be carried out effectively. Effective scavenging improves the output performance, when the engine is running at high-speeds. Moreover, the scavenging is increased as needed, since the degree of opening of the exhaust port 10 occurs in response to increases in engine speed.

The pressure within the exhaust port 10 tends to urge the exhaust control valve 11 in an opening direction, as do the centrifugal weights 35. Therefore, both the centrifugal weights 35 and the pressure in the exhaust port 10 tend to compress the governor spring 47. The pressure within the exhaust port 10 increases as the engine speed is increased. Therefore, if the spring constant of the governor spring 47 is constant, when the engine speed increases, the governor spring 47 is compressed more than is necessary due to the influence of the aforementioned exhaust port pressure. If the governor spring 47 is compressed more than is necessary, the exhaust control valve 11 is opened more than is necessary, and the optimum output performance of the engine is not obtained.

Figure 6:
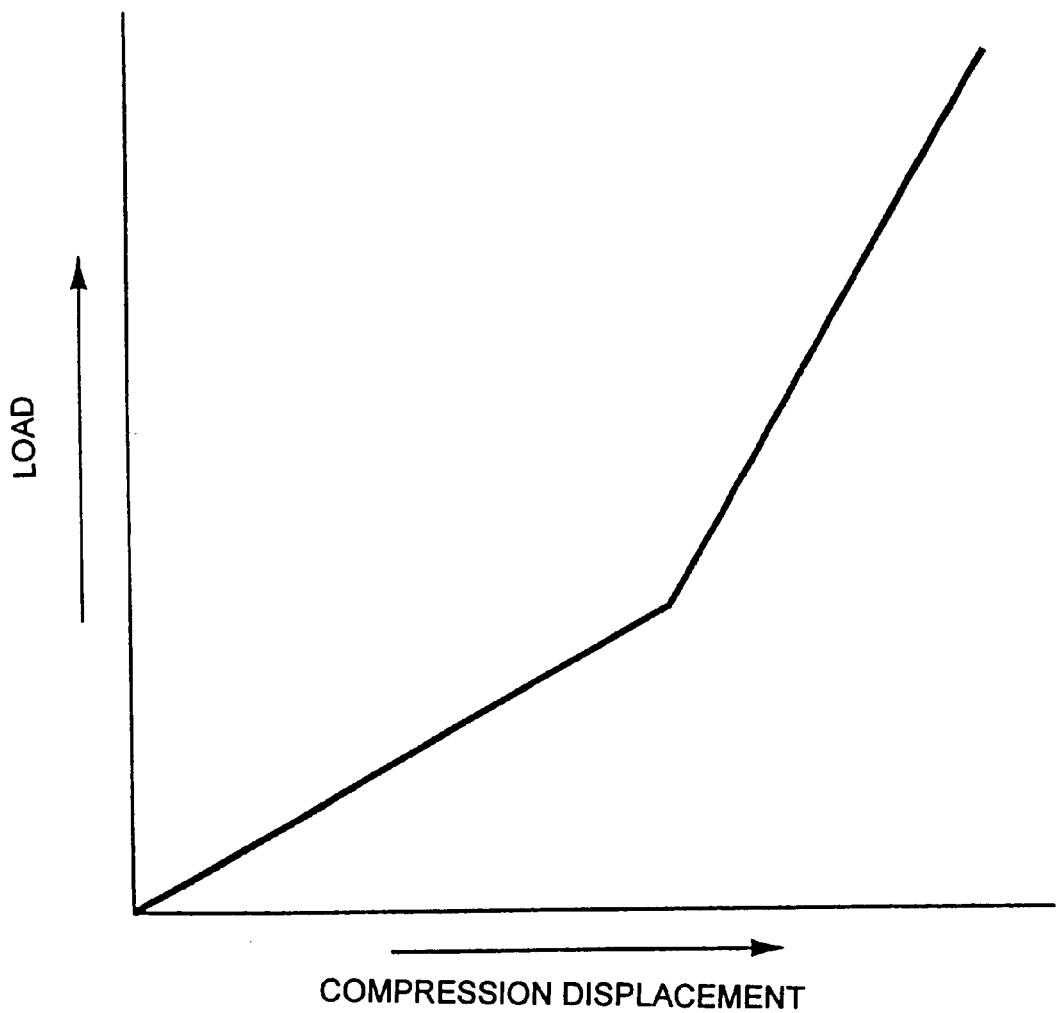
FIG. 6 is a graph of a spring characteristic of a governor spring.

In the first embodiment of the present invention, the governor spring 47 described above is equipped with a small pitch coil section 47a and a large pitch coil section 47b. The spring constant of the governor spring 47 is then relatively small when the engine is running at low speed, as shown in FIG. 6. However, when the engine reaches a prescribed high speed, the small spring constant, small pitch coil section 47a is compressed into a close contact state, so that just the large pitch coil section 47b is operating. When the small pitch coil section 47a is compressed, the spring constant of the governor spring 47 becomes large, i.e. the rate of increasing the load with respect to compressive deformation of the governor spring 47 is high.

The governor spring 47 is therefore not compressed more than is necessary during high-speed running, even if the pressure within the exhaust port 10 increases. The exhaust control valve 11 can be reliably controlled so as to be opened to an extent corresponding to the high-speed state at this time, and the optimum output performance of the engine can therefore be obtained. It is important to note that the number of parts does not increase, because the governor spring 47 comprises one coil spring, and this contributes towards making the centrifugal governor 28 more compact.

Referring back to the exhaust control valve 11, it is important to note that the exhaust control valve 11 is heated by exhaust gas passing through the exhaust port 10. The heat dissipating ability of the valve stem 15 deteriorates as the side of the bushing 16 is approached. This is because the bush 16 side end of the valve stem 15 is completely covered by the pouch-shaped bearing hole 19, into which the bush 16 is inserted. It is therefore easy for heat to become trapped.

However, in accordance with the present invention, the first and second bosses 13a and 14a in their entirety are arranged so as to be offset from the reinforcing wall 12, which may pass through the center of the exhaust port 10. The offset is towards the bearing through hole 20, as illustrated in the Figures by setting the distance (A) to be less than the distance (B). The first and second bosses 13a and 13b are therefore positioned towards the side of the bearing 15 with superior heat dissipation by this offset portion. As a result, the withdrawal of heat from the bosses 13a and 14a towards the valve bearing 15 is carried out in an effective manner, and the heat dissipating ability of the first and second valve elements 13 and 14 is promoted, as is their resistance to heat.

In addition to the distance (A) being less than the distance (B), by setting the second length (D) less than the first length (C), the thermal capacity of the first boss 13a is greater than the thermal capacity of the second boss 14a. The withdrawal of heat from the first and second bosses 13a and 14a to the valve stem 15 is therefore uniform, as is the heat resistance of the first and second valve elements 13 and 14.

Figure 7:
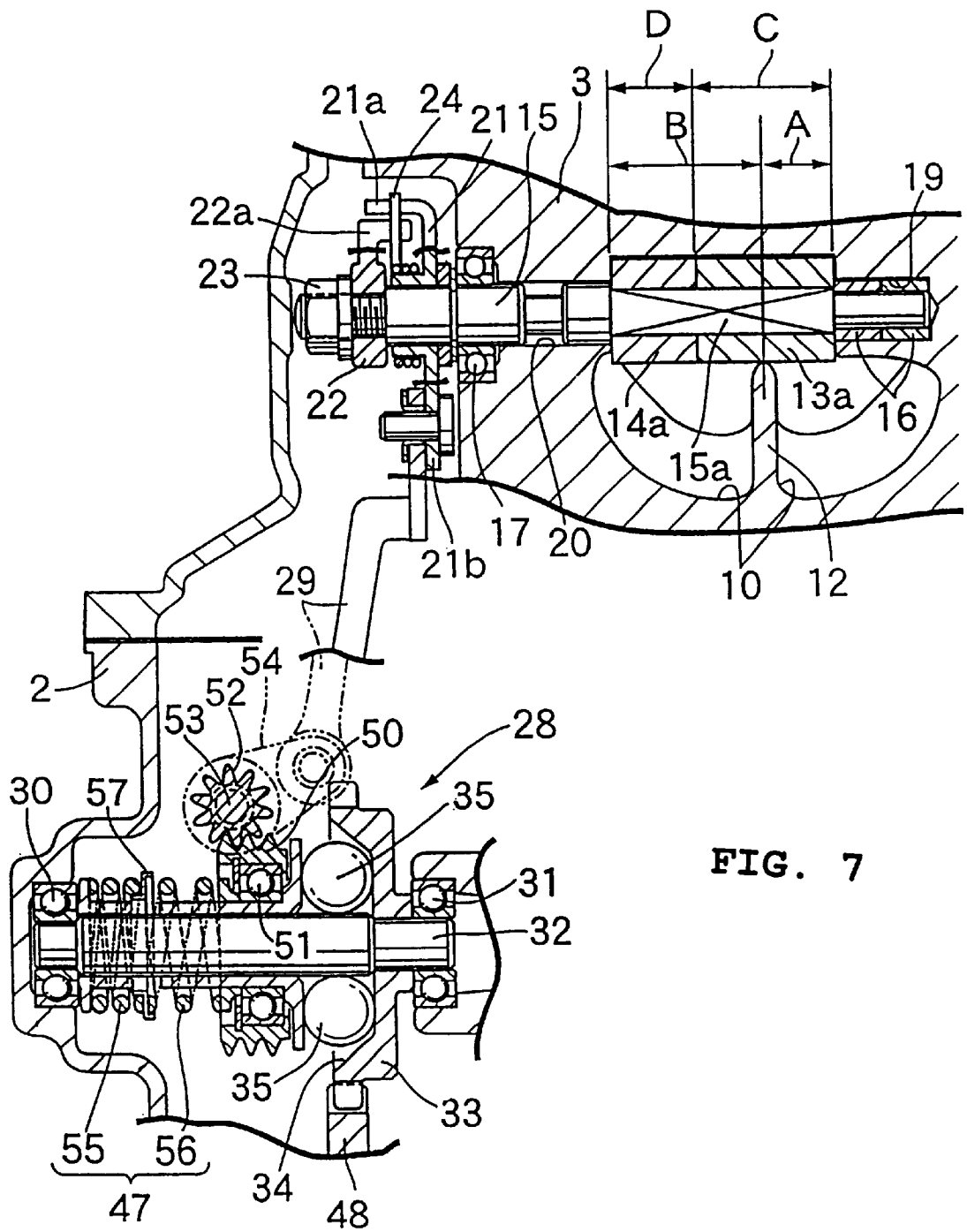
FIG. 7 is a cross-sectional view, similar to FIG. 4, illustrating a modified embodiment of the governor spring.

Now, with reference to FIG. 7, a second embodiment of the governor spring 47 will be described. Same elements are represented by same reference numerals. In the second embodiment, the overall governor spring 47 includes two springs, namely a small pitch coil spring 55 and a large pitch coil spring 56. The small pitch coil spring 55 and the large pitch coil spring 56 are arranged in series with a retainer 57 sandwiched therebetween.

The second embodiment operates in a similar manner to the first embodiment illustrated in FIG. 4. The spring constant of the governor spring 47 increases when the engine is running at high speed. Therefore, the exhaust control valve 11 is prevented from opening too much or too soon when running at high speed. As a result, the output performance of the engine is increased.

It is also possible to use separately made normal equal pitch springs for the small pitch coil spring 55 and the large pitch coil spring 56, so that a cheap governor spring 47 can be obtained and costs can be reduced.

The present invention is not limited to the aforementioned embodiments, and various design modifications are possible without deviating from the spirit of the invention. For example, the governor spring 47 of the first embodiment, having a single spring with two pitch sections, can be replaced by a spring having a successively changing pitch. In other words, one end of the governor spring 47 can have a relatively small pitch and the pitch can continuously increase to a relatively large pitch at the other end of the governor spring 47. Alternatively, the pitch between coils can be made constant, but the material or material thickness of the spring coils can change along the length of the governor spring 47 to cause a corresponding change in the spring constant as the spring is compressed or expanded.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An engine comprising:
    a cylinder block having a cylinder bore;
    an exhaust opening at an inner wall of said cylinder bore;
    an exhaust control valve moveable in an opening direction and a closing direction to at least partially block said exhaust opening; and
    a governor attached to said exhaust control valve for moving said exhaust control valve, said governor including a governor spring urging said exhaust control valve in one direction, wherein said governor spring has at least a first spring section with a first spring force and a second spring section with a second spring force different than said first spring force, such that an overall spring force of said governor spring changes as said exhaust control valve moves.

2. The engine according to claim 1, wherein said spring force increases as the exhaust control valve opens.

3. The engine according to claim 1, wherein said governor spring is compressed in response to opening of said exhaust control valve.

4. The engine according to claim 1, wherein said governor spring is a single coil spring.

5. The engine according to claim 4, wherein said first spring section is a first coil section and said second spring section is a second coil section serially arranged with said first spring section.

6. The engine according to claim 5, wherein said first coil section is compressed first during opening of said exhaust control valve, and said second coil section is compressed later in response to further opening of said exhaust control valve.

7. The engine according to claim 5, wherein said first coil section has a first pitch between coils, and said second coil section has a second pitch between coils, where said second pitch is greater than said first pitch.

8. The engine according to claim 5, wherein said first spring force is an approximately constant first spring force, and said second spring force is an approximately constant second spring force, with said second spring force being greater than said first spring force.

9. The engine according to claim 1, wherein said opening direction of said exhaust control valve corresponds to advancing a timing of opening of said exhaust opening, and said closing direction corresponds to retarding the timing of opening of said exhaust opening.

10. The engine according to claim 1, wherein said engine is a two-cycle engine.

11. An engine comprising:

a cylinder block having a cylinder bore;

an exhaust opening at an inner wall of said cylinder bore;

an exhaust control valve moveable in an opening direction and a closing direction to at least partially block said exhaust opening; and a governor attached to said exhaust control valve for moving said exhaust control valve, said governor including a first spring with a first spring force and a second spring with a second spring force different than said first spring force, both of said first and second springs urging said exhaust control valve in one direction, wherein said first and second springs present an overall spring force which changes as said exhaust control valve moves.

12. The engine according to claim 11, wherein said first spring is a first coil spring and said second spring is a second coil spring.

13. The engine according to claim 12, wherein said first coil spring and said second coil spring are serially arranged.

14. The engine according to claim 13, further comprising;

a retainer positioned between said first coil spring and said second coil spring.

15. The engine according to claim 12, wherein said first coil spring is compressed first during opening of said exhaust control valve, and said second coil spring is compressed next in response to further opening of said exhaust control valve.

16. The engine according to claim 12, wherein said first coil spring has a first pitch between coils, and said second coil spring has a second pitch between coils, where said second pitch is greater than said first pitch.

17. The engine according to claim 12, wherein said second spring force is greater than said first spring force.

18. The engine according to claim 11, wherein said opening direction of said exhaust control valve corresponds to advancing a timing of opening of said exhaust opening, and said closing direction corresponds to retarding the timing of opening of said exhaust opening.

19. The engine according to claim 11, wherein said engine is a two-cycle engine.

* * * * *